US012583045B2

(12) United States Patent
Liu et al.

(10) Patent No.: US 12,583,045 B2
(45) Date of Patent: Mar. 24, 2026

(54) SYSTEMS AND METHODS FOR DYNAMIC ADDITIVE MANUFACTURING WELDING PROGRAM PLANNING

(71) Applicant: Illinois Tool Works Inc., Glenview, IL (US)

(72) Inventors: Shuang Liu, Appleton, WI (US); Dustin Wagner, Appleton, WI (US)

(73) Assignee: Illinois Tool Works Inc.

( * ) Notice: Subject to any disclaimer, the term of this patent is extended or adjusted under 35 U.S.C. 154(b) by 0 days.

(21) Appl. No.: 16/778,636

(22) Filed: Jan. 31, 2020

(65) Prior Publication Data

US 2021/0237186 A1 Aug. 5, 2021

(51) Int. Cl.
| | |
|---|---|
| *B23K 9/04* | (2006.01) |
| *B23K 9/12* | (2006.01) |
| *B23K 9/16* | (2006.01) |

(52) U.S. Cl.
CPC .............. *B23K 9/042* (2013.01); *B23K 9/125* (2013.01); *B23K 9/16* (2013.01)

(58) Field of Classification Search
None
See application file for complete search history.

(56) References Cited

U.S. PATENT DOCUMENTS

| | | | | |
|---|---|---|---|---|
| 12,162,100 B2 * | 12/2024 | Bowman | .............. | B23K 9/0953 |
| 12,162,102 B2 * | 12/2024 | Kadlec | ................. | B23K 9/1062 |
| 12,162,103 B2 * | 12/2024 | Lizotte | ................... | B23K 9/173 |
| 12,168,269 B2 * | 12/2024 | Albrecht | .............. | B23K 9/0953 |
| 12,168,271 B2 * | 12/2024 | Hoeger | ................. | B23K 9/1093 |
| 12,176,792 B2 * | 12/2024 | Jochman | .............. | H02K 7/1815 |
| 12,178,021 B2 * | 12/2024 | Manthe | ................ | B23K 37/003 |
| 12,179,552 B2 * | 12/2024 | Sherrick | ........... | B60H 1/00899 |
| 12,194,579 B2 * | 1/2025 | Zwayer | ................... | B23K 9/24 |
| 12,194,589 B2 * | 1/2025 | Keeble | ................. | B24B 37/015 |
| 2006/0000810 A1 * | 1/2006 | Kerr | ..................... | B23K 26/034 |
| | | | | 219/85.13 |
| 2011/0114839 A1 * | 5/2011 | Stecker | ................. | H01J 37/304 |
| | | | | 250/307 |

(Continued)

FOREIGN PATENT DOCUMENTS

| | | | | | |
|---|---|---|---|---|---|
| CN | | 107008996 A | * | 8/2017 | .............. B23K 9/04 |
| CN | | 107127432 A | * | 9/2017 | .......... B23K 9/0953 |
| WO | WO-2018007042 A1 | * | 1/2018 | .............. B22F 10/20 |

OTHER PUBLICATIONS

Translation of Cn 107008996A (Year: 2017).*

*Primary Examiner* — Elizabeth M Kerr
(74) *Attorney, Agent, or Firm* — MCANDREWS HELD & MALLOY, LTD

(57) ABSTRACT

Disclosed is a welding system configured to perform additive manufacturing, particularly by employing an additive manufacturing tool to build up a part by employing welding-type programs. In some examples, control circuitry controls the additive manufacturing tool to operate in a first welding-type program of a plurality of welding-type programs in response to a determination that the measured temperature is below a first threshold temperature of one or more threshold temperatures, and control the additive manufacturing tool to operate in a second welding-type program of the plurality of welding-type programs in response to a determination that the measured temperature is above the first threshold temperature.

14 Claims, 7 Drawing Sheets

(56) References Cited

U.S. PATENT DOCUMENTS

| | | | |
|---|---|---|---|
| 2015/0209913 A1* | 7/2015 | Denney ................ | B23K 9/1093 |
| | | | 219/76.14 |
| 2017/0144242 A1* | 5/2017 | McQueen .............. | B23K 9/173 |
| 2017/0157693 A1* | 6/2017 | Albrecht .............. | B23K 9/0956 |
| 2018/0341248 A1* | 11/2018 | Mehr ........................ | G06N 3/08 |
| 2019/0255654 A1* | 8/2019 | Beckett ................. | B23K 26/34 |
| 2020/0004225 A1* | 1/2020 | Buller ................... | B33Y 50/02 |

* cited by examiner

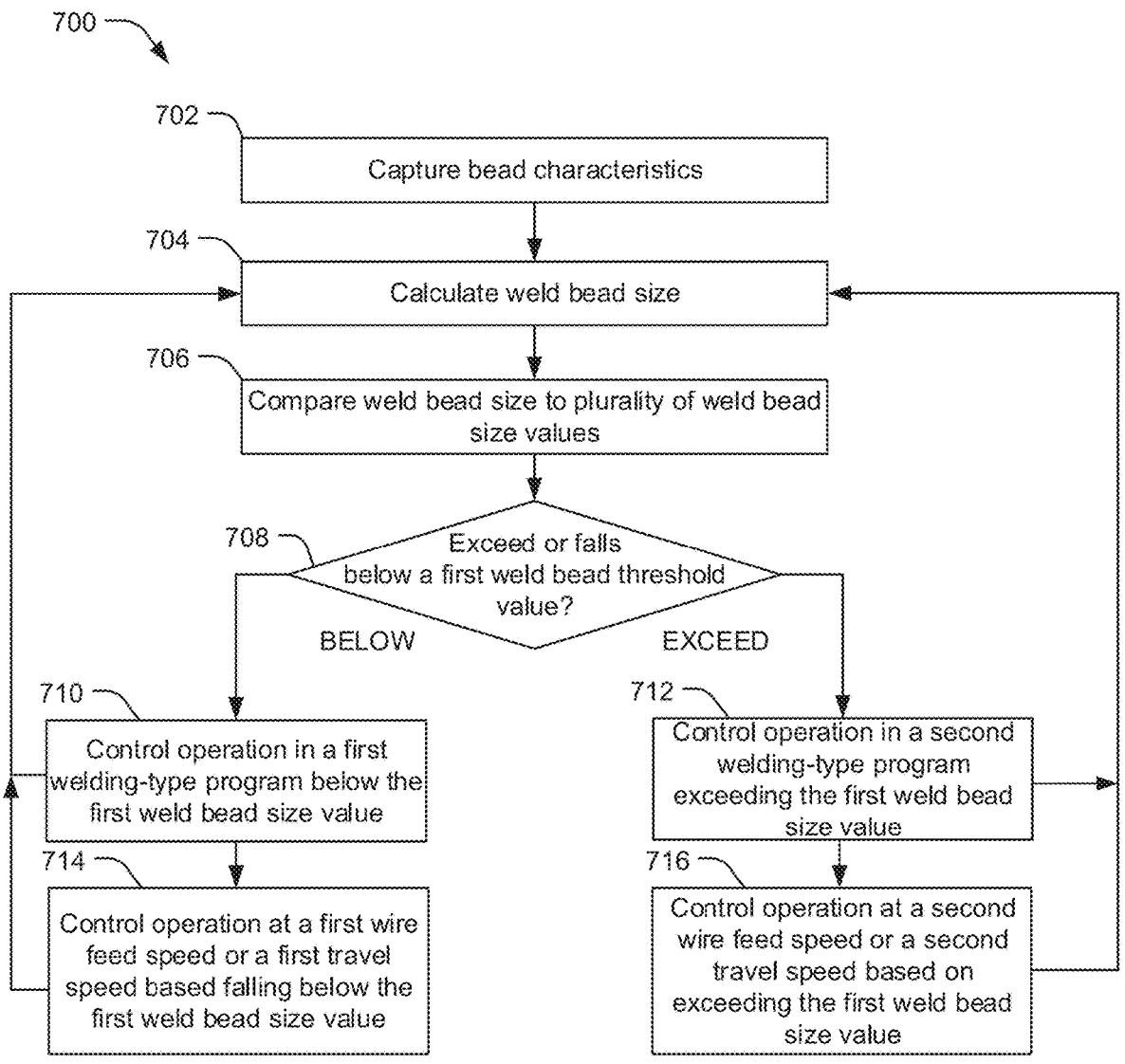

700

702 — Capture bead characteristics

704 — Calculate weld bead size

706 — Compare weld bead size to plurality of weld bead size values

708 — Exceed or falls below a first weld bead threshold value?

BELOW                    EXCEED

710 — Control operation in a first welding-type program below the first weld bead size value 712 — Control operation in a second welding-type program exceeding the first weld bead size value 714 — Control operation at a first wire feed speed or a first travel speed based falling below the first weld bead size value 716 — Control operation at a second wire feed speed or a second travel speed based on exceeding the first weld bead size value

FIG. 7

SYSTEMS AND METHODS FOR DYNAMIC ADDITIVE MANUFACTURING WELDING PROGRAM PLANNING

BACKGROUND

Additive manufacturing is a process that deposits material in a layered fashion to build up a part into a particular geometry. Various techniques have been implemented to build with specific materials. However, maintaining desired adhesion between layers, and/or integrity of the part has proven challenging with some materials.

SUMMARY

The present disclosure relates generally to additive manufacturing systems, and more particularly to an additive manufacturing tool to build up a part by employing welding-type programs. In some examples, control circuitry controls the additive manufacturing tool to operate in a first welding-type program of a plurality of welding-type programs in response to a determination that the measured temperature is below a first threshold temperature of one or more threshold temperatures, and control the additive manufacturing tool to operate in a second welding-type program of the plurality of welding-type programs in response to a determination that the measured temperature is above the first threshold temperature, substantially as illustrated by and described in connection with at least one of the figures, as set forth more completely in the claims.

DRAWINGS

FIG. 7 illustrates yet another example method of controlling an additive manufacturing system, in accordance with aspects of this disclosure.

The figures are not necessarily to scale. Where appropriate, similar or identical reference numbers are used to refer to similar or identical components.

DETAILED DESCRIPTION

Figure 1:
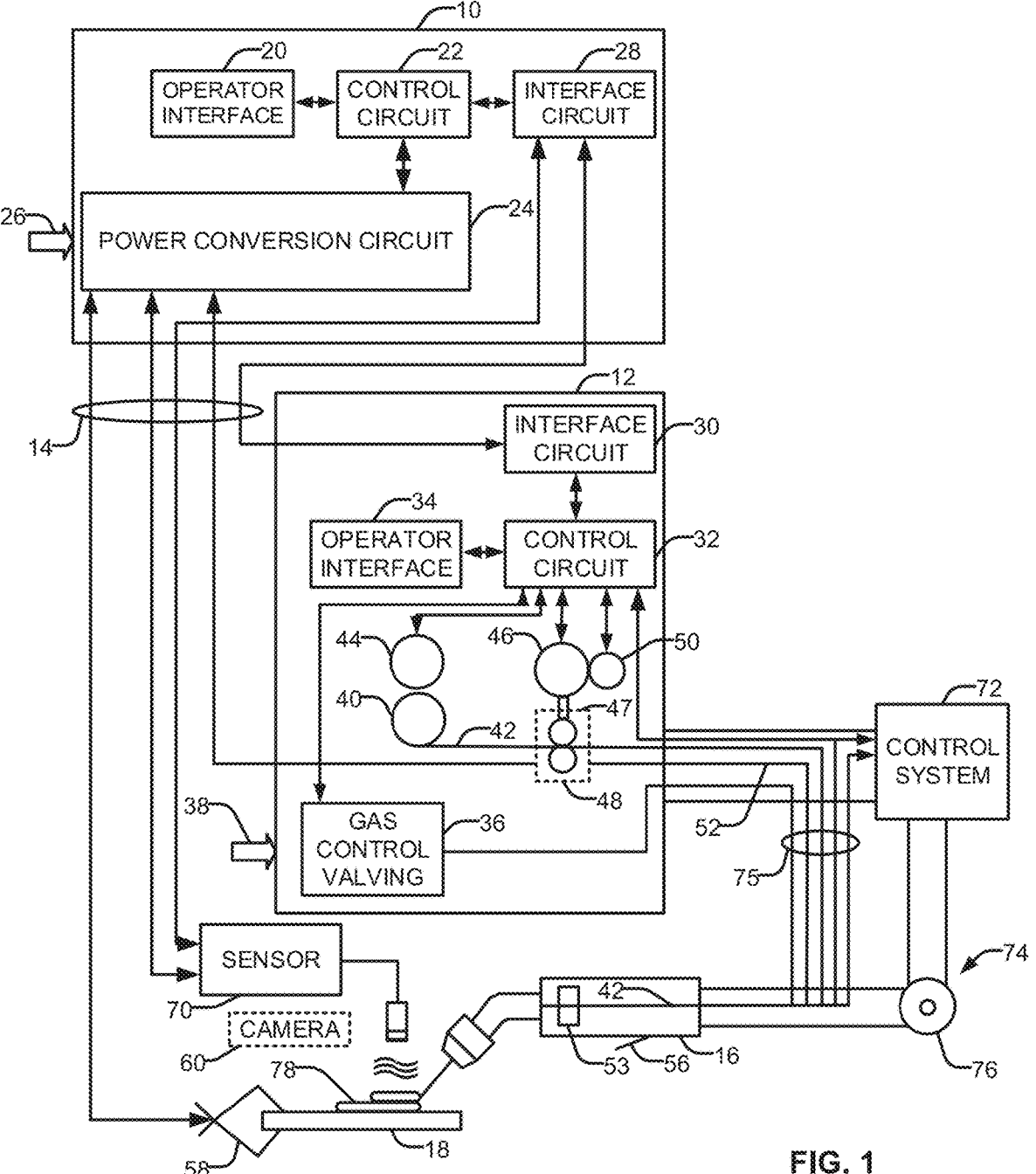
FIG. 1 illustrates an additive manufacturing system employing a welding process to create a multilayer part, in accordance with aspects of this disclosure.

The present disclosure describes systems and methods for forming a multilayered part by additive manufacturing techniques. An additive manufacturing system employs sensor data (e.g., from a temperature sensor) in conjunction with a plurality of welding-type programs and stored geometric models to build up the part by application of material (e.g., an electrode wire) into a series of layers.

The present disclosure relates generally to additive manufacturing systems, and more particularly to an additive manufacturing tool to build up a part by transitioning between welding-type programs. The system is designed to adjust the heat input by changing the welding-type program before and/or during operation to build the part. For example, one or more temperature sensors can be placed along the weld path (e.g., in front of the additive manufacturing tool or welding torch) to measure the temperature at one or more locations (e.g., as the weld bead forms). If a relatively high temperature is measured (in comparison to one or more threshold temperatures), then the control circuitry will command a change in the welding-type program to a welding-type program that has a lower heat output (e.g., Control Short Circuiting (CSC) welding-type program, a Joule heating welding-type program). If a relatively low temperature is measured, then the control circuitry will command a change to a welding-type program that has a higher heat output (e.g., Constant Voltage (CV) spray welding-type program, a pulsed spray welding-type program, etc.).

In this manner, the additive manufacturing system controls the heat of the application to regulate temperature of the part during fabrication. The result is greater a part, such as a multilayer part, with enhanced adhesion and limited amount of warp between layers.

Additive manufacturing is any of various processes in which material is joined or solidified under computer control to create a three-dimensional object, with material being added together in a layered fashion. For example, three-dimensional (3D) printing is used in both rapid prototyping and additive manufacturing using technologies such as stereolithography (SLA) or fused deposit modeling (FDM).

Through additive manufacturing techniques, objects of almost any shape or geometry can be created, typically by use of a digital three-dimensional model. Traditional techniques for creating an object like injection molding can be less expensive for the manufacture of some products in high quantities. By contrast, additive manufacturing may be faster, more flexible and/or less expensive when producing fewer parts. Thus, additive manufacturing systems give designers and manufacturers the ability to produce parts and concept models in less time with greater flexibility. Thus, unlike material removed from a stock in conventional machining processes, additive manufacturing builds a three-dimensional object from a computer-aided design (CAD) model or Additive Manufacturing File Format (AMF) file, usually by successively adding material (e.g., an electrode wire) layer by layer.

Powder is a widely used deposition material because powder provides a flexible and robust process. However, powder based processes have been developed towards the manufacture of small and complex geometries. Using wire as a deposition material is a less common but useful technique. Wire deposition material is especially useful in the manufacturing of large and sturdy structures. Compared to powder, wire deposition has several advantages, including near 100% utilization of material, good out-of-position tolerance, better surface finish, high deposition rate, cleaner work environment, and lower cost of materials.

In some examples, the additive manufacturing system is configured to build the part by direct energy deposition (DED) techniques. For instance, a multilayer part can be fabricated layer by layer through introducing material (e.g., a consumable electrode wire) via one or more of a variety of welding technologies (e.g., Metal Inert Gas (MIG) welding, plasma welding, laser hot-wire DED, etc.). Within MIG welding processes, different welding programs can be implemented, some with different heat profiles. For example, a pulse welding-type program is associated with a high heat profile relative to a hot wire welding-type program.

In the DED process, the feedstock material, which comes in either metal powder or wire form, is pushed through a feed nozzle where it is melted by a focused heat source (e.g., a welding arc) and successively added to build the layers of the part. Material is added layer by layer and solidifies as it cools, creating new features on the underlying layers of the part. Some of the advantages of employing this process include a wide range of metals that can be used, such as titanium, stainless steel, aluminum, nickel, copper, alloys, and any number of other specialty materials and/or composite material. By these processes, relatively large parts can be built at a relatively fast pace (in comparison to other additive manufacturing techniques), with relatively little wasted material.

However, materials such as metal are heated and cooled at a rapid rate when building a part using arc welding processes. For example, at the start of a DED process, the substrate upon which the part is being formed is relatively cold. Thus, heat from a welding process is absorbed and dissipates quickly, which causes a lack of fusion at the first few layers (see, e.g., FIG. 8A).

After several layers have been formed, the substrate temperature has increased, and heat from the molten pool dissipates through the built up layers toward the substrate. As this continues, the heat accumulates and the cooling rate slows, resulting in a hotter and bigger molten pool. Eventually, the molten pool will collapse, causing damage to the part and halting the DED process (see, e.g., FIG. 8B).

In an effort to control the heat input to the molten pool, size and temperature may be regulated. For example, if the molten pool size or temperature exceeds a certain value, a variable of the process (e.g., welding speed, wire feed speed) can be adjusted resulting in a reduced heat input. However, in a MIG welding program, wire feed speed and heat input are controlled as a single factor. Therefore, adjustment of these variables leads to a relatively small change to the heat input, which may not effectively address the thermal accumulation issue.

Another option is through adjusting the multilayered part path planning, which may provide the underlying layer more time to cool down. However, adjusting the layered path plan to address heat requires complex path planning work and intense customization. Moreover, alternating or modifying the path plan can significantly slow down the fabrication process, as the process must stop, adjust position, and start frequently.

Yet another option is to preheat the substrate to a suitably high temperature, which encourages fusion with the material deposited during the first few passes while using a low heat input process (e.g., hot wire or CSC welding-type programs). However, preheating requires an additional step and time in the part build cycle, by heating up the substrate first before printing, often with a dedicated heating system, which adds further complexity. For example, to preheat a substrate, a system should include an integrated heater or require an oven or furnace, which would require transportation and handling the substrate in order to print the desired parts.

By use of the additive manufacturing system disclosed herein, the temperature and weld bead characteristics can be regulated to improve layer fusion and consistency. Employing a temperature sensor to monitor the temperature of the substrate (including each previous layer, which serves as a substrate for a successive layer), allows the control circuitry to determine a suitable welding-type program for a measured temperature during part buildup to ensure suitable fusion between layers and material wetting to the substrate at the beginning of the additive manufacturing process.

Advantageously, heat input is regulated via the control circuitry, thereby limiting the use of additional and complex components.

Accordingly, the additive manufacturing system implements changes to the welding-type process from within the power source, without the use of preheating devices (e.g., laser systems, substrate heating systems, wire electrode heating systems, etc.), or altering the part planning (e.g., to reduce overheating). These advantages are realized by use of control circuitry to dynamically adjust operation of the welding-type program in response to a measured temperature or heat profile associated with the part being formed and/or the welding output.

For example, at the beginning of an additive manufacturing operation, a high heat output process (e.g., a spray welding-type program) may be selected to quickly heat a cold substrate and encourage fusion on the first few layers of the part. The substrate (and part) may heat quickly, such that a measured temperature may exceed a first threshold temperature value. In response, and to avoid an overheated weld bead, the control circuitry can switch to a welding-type program with a relatively low heat profile (e.g., a short circuiting welding-type program, a joule heating welding-type program, etc.). The system is configured to monitor heat and transition between welding-type programs dynamically before and/or during an additive manufacturing operation.

Additionally or alternatively, various welding parameters may be dynamically adjusted to modify the heat profile beyond welding-type program. For instance, with a short circuiting process, the wire feeding speed may be capped at certain wire feeding speed, which is lower than the setting wire feeding speed of high heat input program. If so, in order to match the bead size, once switching to the low heat input process, the welding speed can be slowed down proportionally. Similarly, at a higher heat output welding-type program (e.g., CV spray, pulse spray, etc.), one or more of the wire feed speed, travel speed, and/or deposition rate can be relatively higher.

In some examples, the control circuitry determines that the temperature and/or a change in temperature is great enough that one or more intermediate welding-type programs are skipped over to implement the desired program. For example, if deposition along the path plan brings the additive manufacturing tool from a heated portion of the part to an unheated portion, the measured temperature (or change in temperature) may require a transition from a low heat "hot wire" welding-type program to a high heat spray welding-type program, thereby bypassing one or more intermediate welding-type programs.

Advantageously, the disclosed additive manufacturing systems and methods achieve improved fusion, wetting, speed and flexibility without the need for additional and complex components. For instance, conventional systems use ovens and/or other heating systems for substrate preheating. Some conventional systems require an additional laser system to provide heat, adding complexity and expense. Further, complex path planning and/or systems to carry it out are avoided, with the added speed associated with a dynamic system, as disclosed herein (e.g., by eliminating the need to move around the part platform or wait for an overheated part to cool).

In disclosed examples, an additive manufacturing system includes an additive manufacturing tool configured to advance an electrode wire to a weld puddle on a surface of a part, a sensor to measure a temperature of the part and control circuitry. The control circuitry is configured to monitor the measured temperature associated with the part; compare the measured temperature to one or more threshold temperatures; control the additive manufacturing tool to operate in a first welding-type program of a plurality of welding-type programs in response to a determination that the measured temperature is below a first threshold temperature of the one or more threshold temperatures, and control the additive manufacturing tool to operate in a second welding-type program of the plurality of welding-type programs in response to a determination that the measured temperature is above the first threshold temperature.

In some examples, the first welding-type program comprises a spray welding-type program. In examples, the spray welding-type program comprises a Constant Voltage (CV) spray welding-type program or a pulsed spray welding-type program. In examples, the second welding-type program comprises a Control Short Circuit (CSC) welding-type program.

In some examples, the control circuitry is further configured to control the additive manufacturing tool to operate in a third welding-type program in response to a determination that the measured temperature is above a second threshold temperature of the one or more threshold temperatures. In examples, the third welding-type program comprises a joule heating welding-type program. In examples, the additive manufacturing tool comprises a metal inert gas (MIG) arc welding torch.

In some examples, the part is a multi-layer part being formed by the additive manufacturing system. In examples, the control circuitry is further configured to receive one or more three-dimensional models of the multi-layer part; and adjust an operational characteristic of the system based on one or more of the three-dimensional models. In examples, the operational characteristic comprises a wire feeder direction of the wire feeder motor, a power output, a deposition path, a deposition sequence, or a tool angle, based on one or more of the three-dimensional models.

In disclosed examples, an additive manufacturing system includes an additive manufacturing tool configured to advance an electrode wire to a weld puddle on a surface of a part, a sensor to measure a temperature of the part and control circuitry. The control circuitry is configured to monitor the measured temperature associated with the part, compare the measured temperature to a list of temperatures associated with a plurality of welding-type programs, determine whether the measured temperature corresponds to a first welding-type program or a second welding-type program of the plurality of welding-type programs based on the comparison, control one or more of a wire feed speed or a travel speed of the additive manufacturing tool to operate at a first wire feed speed or a first travel speed corresponding to the first welding-type program based on the determination that the temperature corresponds to the first welding-type program, and control one or more of the wire feed speed or the travel speed of the additive manufacturing tool to operate at a second wire feed speed or a second travel speed corresponding to the second welding-type program based on the determination that the temperature corresponds to the second welding-type program.

In some examples, the control circuitry is further configured to compare the temperature measurements over a period of time, calculate a rate of temperature change of over the period, compare the rate of temperature change to a list of threshold rate of temperature change values, control the additive manufacturing tool to operate in the first welding-type program based at least in part on a determination that the rate of temperature change is below a first temperature change value, and control the additive manufacturing tool to operate in a second welding-type program based at least in part on a determination that the rate of temperature change is above the first temperature change value.

In some examples, a camera is used to capture one or more weld bead characteristics. The control circuitry is further configured to calculate weld bead size based on the one or more weld bead characteristics, compare the weld bead size to a list of threshold weld bead size values, control the additive manufacturing tool to operate in the first welding-type program based at least in part on a determination that the weld bead size is below a first weld bead size value, and control the additive manufacturing tool to operate in a second welding-type program based at least in part on a determination that the weld bead size is above the first weld bead size value.

In examples, the control circuitry is further configured to control one or more of the wire feed speed or the travel speed of the additive manufacturing tool to operate at the first wire feed speed or the first travel speed based in part on the first weld bead size value, and control one or more of the wire feed speed or the travel speed of the additive manufacturing tool to operate at the second wire feed speed or the second travel speed based in part on the second weld bead size value.

In some examples, the control circuitry is further configured to monitor a current or a voltage associated with a power output to the additive manufacturing tool, compare the current or voltage to a list of current or voltage values, control the additive manufacturing tool to operate in the first welding-type program based at least in part on a determination that the current or voltage is below a first current or voltage value, and control the additive manufacturing tool to operate in a second welding-type program based at least in part on a determination that the current or voltage is above the first current or voltage value.

In examples, the additive manufacturing tool comprises an arc welding-type torch. In examples, the one or more temperatures correspond to one or more threshold temperatures.

In some examples, the part is a multi-layer part being formed by the additive manufacturing system. In examples, the control circuitry is further configured to receive one or more three-dimensional models of the multi-layer part, and adjust the wire feed speed or the travel speed of the additive manufacturing tool based on one or more of the three-dimensional models. In examples, the control circuitry is further configured to adjust an operational characteristic of the system based on one or more of the three-dimensional models.

As used herein, the term "additive manufacturing", is a manufacturing process in which material is joined or solidified under computer control to create a three-dimensional object, with material being added together in a layered fashion.

As used herein, the term "direct energy deposition" or DED, is a manufacturing process in which material is added together in a layered fashion, by use of one or more material forming technologies.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "pulsed welding" or "pulsed MIG welding" refers to techniques in which a pulsed power waveform is generated, such as to control deposition of droplets of metal into the progressing weld puddle.

As used herein, the term "boost converter" is a converter used in a circuit that boosts a voltage. For example, a boost converter can be a type of step-up converter, such as a DC-to-DC power converter that steps up voltage while stepping down current from its input (e.g., from the starter battery) to its output (e.g., a load and/or attached power bus). It is a type of switched-mode power supply.

As used herein, the term "buck converter" (e.g., a step-down converter) refers to a power converter that steps down voltage (e.g., while stepping up current) from its input to its output.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid-state storage, a computer-readable medium, or the like.

As used herein, the term "torch," "tool" or "welding-type tool" can include a hand-held or robotic welding torch, gun, or other device used to create the welding arc.

As used herein, the term "hot wire" refers to a welding-type program such that an electrode wire being consumed during operation is electrified to heat the wire without creating a welding arc.

FIG. 1 illustrates an example additive manufacturing system. As shown, the additive manufacturing of FIG. 1 is an arc welding system, although other additive manufacturing processes and techniques are considered. A power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples, the wire feeder may be integrated with the power supply 10. In such cases, the conduits 14 would be internal to the system.

In examples in which the wire feeder 12 is separate from the power supply 10, terminals are typically provided on the power supply 10 and on the wire feeder 12 to allow the conductors or conduits to be coupled to the systems so as to allow for power and gas to be provided to the wire feeder 12 from the power supply 10, and to allow data to be exchanged between the two devices.

The system is configured to provide wire, power, and shielding gas to an additive manufacturing tool or welding torch 16. The tool 16 may be of many different types, and may allow for the feed of a welding wire 42 and gas to a location adjacent to a substrate or platform 18 upon which a part 78 is to be formed. In some examples, a second conductor 58 may be run to the welding substrate 18 so as to complete an electrical circuit between the power supply and the workpiece.

The welding system is configured for data settings to be selected by the operator and/or a welding sequence, such as via an operator interface 20 provided on the power supply 10 or via interface 28 to a remote computer or processor. The operator interface 20 may be incorporated into a front faceplate of the power supply 10, and may allow for selection of settings such as the welding process, the type of wire to be used, voltage and current settings, and so forth. In particular, the system is configured to allow for welding with various materials, including steels, aluminums, alloys, and/or other welding wire that is channeled through the tool 16. Further, the system is configured to employ welding wires with a variety of cross-sectional geometries (e.g., circular, substantially flat, triangular, etc.). These weld settings are communicated to a control circuitry (or control circuit) 22 within the power supply. The system may be particularly adapted to implement welding regimes configured for certain welding wire types.

Additionally or alternatively, process instructions for additive manufacturing can be provided via a weld sequence program, such as stored on a memory accessible to a processor/control circuitry 22 associated with the power supply 10. In such a case, the sequencer can employ stored information (e.g., associated with a desired product configuration and/or process, including historical data), and/or customizable by a user. For instance, information associated with a particular design (e.g., one or more three-dimensional models and/or thermal profiles associated with the part 78, material characteristics, system control parameters, etc.) corresponding to the part 78 can be stored in a memory and/or provided via a network interface, as described in greater detail with respect to FIG. 2. Thus, the information can be used to control operation of the system to facilitate formation of the part 78, such as by controlling a power output from the power supply 10, wire feeder motors 48, 53, robotic system 72, an optional laser system, etc.

In this manner, the system and/or the control circuitry 22 controls formation of the part 78 by transitioning between welding-type programs associated with one or more temperatures or heat profiles during the additive manufacturing process. For example, a sensor(s) 70 can measure operational parameters associated with operation of the system (e.g., heat, current, voltage, inductance, phase, power, speed, acceleration, orientation, position, etc.). The sensed operational characteristic (e.g., voltage, current, orientation, temperature, shape, speed, etc.) can be provided to the control circuitry 22 or other controller (e.g., control circuitry 32, a controller associated with the robotic system 72, etc.) to further control the additive manufacturing process. In examples, a sensor 70 includes a heat sensor (e.g., an infrared (IR) camera, a thermistor, a thermometer, etc.)

In this manner, the system and/or the control circuitry 22 controls formation of the part 78 by adjusting one or more operational characteristics of the system during the additive manufacturing process. The operational characteristics may include, but are not limited to, wire feeder speed, wire feeder direction, travel speed, power output, process mode, deposition path, deposition sequence, torch angle, torch height, etc.

Power from the power supply is applied to the wire electrode 42, typically by a cable 52. The control circuitry 22 is configured to control the type of welding program implemented, to ensure the heat at the part 78 is suitable for the desired welding sequence (e.g., according to the wire type, substrate material, dimensions of the part, etc.).

In some examples, the power supply 10 can be controlled to preheat the welding wire 42, such as by applying a relatively low current to resistively heat the welding wire 42 through a circuit formed through the workpiece. Similarly, shielding gas may be fed through the wire feeder and the welding cable 52. During welding operations, the welding wire 42 is advanced through a jacket of the welding cable 52 towards the tool 16. In some examples, within the tool 16, a second wire feeder and/or motor 53 comprises rollers, which may be provided with an associated drive roller, which can be regulated to provide the desired wire feed speed and/or direction.

A robotic system 72 can be employed to regulate movement and position of the tool 16 in accordance with the control circuitry 22, 32, as well as information from sensor(s) 70, for example. In examples, the robotic system 72 may be in communication with the power supply 10, the wire feeder 12 and/or the tool 16 via one or more cables 75. Thus, power and/or information can be provided and/or exchanged via cable 75 to control the additive manufacturing process. In particular, the robotic system 72 can employ one or more arms 74 having one or more actuators 76 (e.g., servo motors, joints, etc.). In this way, the robotic system 72 can command fine control of the attached tool 16 in six degrees of freedom during the welding operation, including travel speed, tool location, distance from the part 78, etc. The robotic system 72 may include one or more sensors to sense operational characteristics, which can be communicated with the control circuitry 22, 32 to further facilitate formation of the part 78.

In some examples, the control circuitry 22, 32 may provide a signal to the wire feeder 12, the power supply 10, the laser system 60, and or the robotic system 72 to enable the additive manufacturing process to be started and stopped in accordance with a particular part design. That is, upon initiation of the process, gas flow may begin, wire may advance, and power may be applied to the cable 52 and through the tool 16 to preheat the advancing welding wire 42, as well as to the laser system 60.

The control circuitry 22 is coupled to power conversion circuit 24. This power conversion circuit 24 is adapted to create the output power for the tool 16. Various power conversion circuits may be employed, including choppers, boost circuitry, buck circuitry, inverters, converters, and so forth. The configuration of such circuitry may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells, and/or other alternative sources. The power supply illustrated in FIG. 1 may also include an interface circuit

28 configured to allow the control circuitry 22 to exchange signals with the wire feeder 12.

The wire feeder 12 includes a complementary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also includes control circuitry 32 coupled to the interface circuit 30. As described below, the control circuitry 32 allows for wire feed speeds to be controlled in accordance with operator selections or stored sequence instructions, and permits these settings to be fed back to the power supply via the interface circuit. The control circuitry 32 is coupled to an operator interface 34 on the wire feeder that allows selection of one or more welding parameters, such as wire feed speed. The operator interface may also allow for selection of such weld parameters as the welding-type program, the type of wire utilized, current, voltage or power settings, and so forth. The control circuitry 32 may also be coupled to gas control valving 36 which regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding tool 16 and thereby to the welding application, under the control of control circuitry 32. For example, one or more spools of welding wire 40 are housed in the wire feeder. Welding wire 42 is unspooled from the spools and is progressively fed to the tool 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the tool 16.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuitry 32, such as for continued or periodic monitoring, calibration, etc. In some examples, the system includes a wire spool motor for rotating the wire feeding device, which can be similarly adjusted to increase or decrease the amount of wire between wire feeder motors.

In some examples, the wire feeder 12 can be configured to reverse the direction of the welding wire 42. Moreover, although described as operating with two wire feeders and/or wire feeder motors (e.g., wire feeder motors 46 and 53), the system can operate with a single wire feeding unit to advance and/or reverse wire during formation of the part. Additionally or alternatively, in some examples, one wire feeder may be configured to advance the wire while another wire feeder is configured to reverse the direction of the wire. In this example, one or more control circuits (e.g., control circuitry 22, 32) coordinates operation of the two wire feeders to implement an additive manufacturing operation employing dynamic control of welding-type programs, as disclosed herein.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

In some examples, a camera 60 can be used to monitor characteristics of the part 18 during formation. In this manner, the camera 60 can send data to the control circuitry 22, which can be compared against stored and/or calculated data corresponding to desired part characteristics. For example, the camera 60 can capture images of the weld bead during an additive manufacturing operation, such as the width, shape, color, fluidity, etc. This data can be compared against stored data (e.g., historical data, and/or ideal characteristic data) or calculated data (e.g., characteristic data based on one or more inputs, such as power supply output, wire type, part formation, etc.), which can be used to determine an adjustment to the welding-type program or other operational output (e.g., wire feed speed, travel speed, power output, etc.).

Although described with respect to a welding-type system, the disclosed system may be implemented in conjunction with a variety of technologies to conduct additive manufacturing processes. In but one example, additive manufacturing may employ an arc welding torch to melt material into droplets to build up a layered part in a manner similar to the systems and methods disclosed herein.

Figure 2:
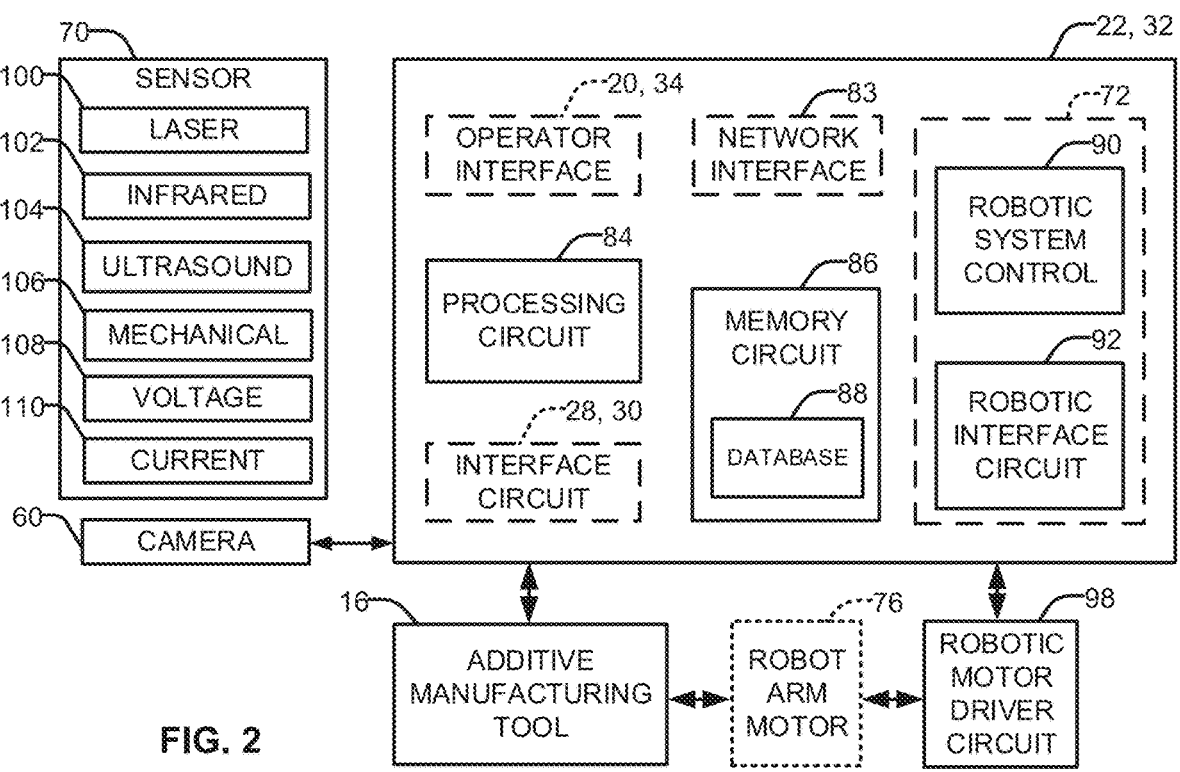
FIG. 2 illustrates example control circuitry and components for an additive manufacturing system, in accordance with aspects of this disclosure.

FIG. 2 illustrates an example control circuit, such as one or both of the control circuitries 22, 32, configured to function in a system of the type illustrated in FIG. 1. The overall circuitry may include the operator interfaces 20 and 34 and/or interface circuits 28 and 30. For example, the various interfaces can provide communication of operational parameters, including user input and networked information via network interface 83, as well as information from downstream components such as a wire feeder, a welding torch/tool, and various sensors and/or actuators.

The control circuitry includes processing circuitry 84 which itself may include one or more application-specific or general purpose processors. The processing circuitry 84 may be further configured to carry out welding sequences such as corresponding to formation of a particular additive manufacturing part. The processing circuitry 84 can receive information regarding the part from a database 88 stored in memory circuitry 86, and/or receive the information from a networked computer and/or a user input. Based on the information, the processing circuitry 84 can control and/or coordinate actions of the system components by making computations for implementation of an additive manufacturing process.

The various models and inputs can be correlated based on a number of variables of the additive manufacturing process. For example, geometric features of the three-dimensional model may correspond to a point in time and/or space associated with the process and/or part. For instance, a first or base layer of the part may correspond with an earlier time than a later applied layer. The three-dimensional model may similarly correspond to the process timeline, as well as correspond to the feature of the three-dimensional model at that point in time. The welding sequence can also be synced to the models, to ensure that the welding operation is adjusted to correspond to the requirements of the models.

In some examples, the sensor 70 is configured to scan the part periodically or continuously during the additive manufacturing process. This scan can be fed back to the processing circuit to compare with a desired characteristic (e.g., a temperature, heat profile, three-dimensional model, etc.) to either ensure that the part being formed conforms to a desired output, and/or to identify variations. Based on the comparison, the processing circuitry 84 can adjust one or more of the welding-type program and/or an operational characteristics to facilitate formation of the part.

As provided herein, sensor 70 may include an infrared sensor 102 or other heat sensor, an ultrasound sensor 104, a mechanical sensor 106, which may determine position or orientation of a torch 16, a voltage sensor 108, a current sensor 110, to name but a few. Similarly, sensor data from the various sensors can be fed back to the processing circuitry 84 for analysis and control of operational characteristics, such as in a controlled feedback loop. Additionally or alternatively, camera 60

In some examples, robotic system 72, which may include a robotic system control 90 and/or robotic interface circuit 92, can be integrated with one or more components of the circuitry, such as control circuitry 22, 32. In other examples, all or part of the robotic system 72 can be located remotely from one or both of the power supply or the wire feeder, and communicate via the robotic interface circuit 92 and one or more of the interface circuits 23, 34, 28, 30, 83.

The robotic system 72 is in communication with the processing circuitry 84, as well as the plural interfaces and memory circuitry 86. The robotic control system 90 is configured to control operation of the robotic arm 74 via control of a robotic motor drive circuit 98, which controls a robotic arm motor or actuator 76. In this way, the location and/or orientation of the tool 16 is controlled in coordination with data provided by sensors, models, inputs, etc. As a result, geometric features of the part are formed by control of multiple variables that contribute to creation of the part.

Additionally or alternatively, one or more of the interfaces (e.g., interface circuits 28, 30; operator interfaces 20, 34, etc.) can provide information corresponding to operational parameters of the system. In this example, operational parameter information can be provided by one or more of the wire feeder motors, such as current draw, voltage, power, inductance, wire feed speed, wire feed acceleration, wire feeder motor angle, torque, position, etc., which can be analyzed by the processing circuitry 84 to indirectly determine one or more operational characteristics. This process can be implemented in conjunction with the sensors 70 or without to achieve a similar result.

The processing circuitry 84 will also be associated with memory circuitry 86 which may consist of one or more types of permanent and temporary data storage, such as for providing the welding sequences implemented, storing the available welding-type programs, storing temperatures corresponding to one or more welding-type programs, storing the three-dimensional and thermal models, storing operational characteristics, storing weld settings, storing error logs, etc. The adjustment of the welding-type programs or the operational characteristics can be made by reference and/or comparison to historical data from preceding additive manufacturing operations, which can also be stored on memory circuitry 86. For instance, adjustment may be made on the basis of stored data based on a historical analysis of a similar additive manufacturing operation. The historical data can correspond to, for example, welding-type programs and associated temperatures, operational parameters, other sensor data (e.g., temperature, weld bead characteristics), a user input, as well as data related to trend analysis, threshold values, profiles associated with a particular mode of operation, etc., and can be stored in a comparison chart, list, library, etc., accessible to the processing circuitry 84.

Accordingly, as described above, sensed current and or voltage, and the known inputs include wire type and wire diameter, the processing circuitry 84 may receive sensor data including voltage and/or current. The processing circuitry 84 may retrieve known inputs including wire type and wire diameter from the memory circuitry 86. In some examples, the known inputs are received from the operator interface 20, 34. Using a model and/or list of values, a suitable welding-type program and/or operational parameter may be retrieved from the memory circuit 86 based on the measured temperature. Thus, a stable additive manufacturing process may be accomplished with the wire 42 provided to the part at a desired heat input in order to avoid defects.

In some examples, the processing circuitry 84 includes a timer, a speed sensor, or other sensor that may provide information regarding the additive manufacturing process, such as the amount of wire consumed, an estimate of the anticipated progress for the manufacturing process, etc. Additionally or alternatively, the control circuitry 22, 32 can be configured to monitor and/or adjust a power output characteristic (e.g., current, voltage, power, phase, etc.) associated with the power supply.

The processing circuitry 84 is further configured to control the welding-type program. The processing circuitry 84 provides control signals to the power supply 10 to adjust the welding-type program in response to information corresponding to an amount of wire between the two wire feeder motors, for example. In particular, the sensors 70 can monitor one or more characteristics of the tool 16, the power supply output, and/or the part 78 (e.g., temperature, weld puddle size, shape, location of the electrode wire and/or the cathode spot on the weld puddle, etc.), and provide data to the processing circuitry 84 for analysis and determination.

Figure 3:
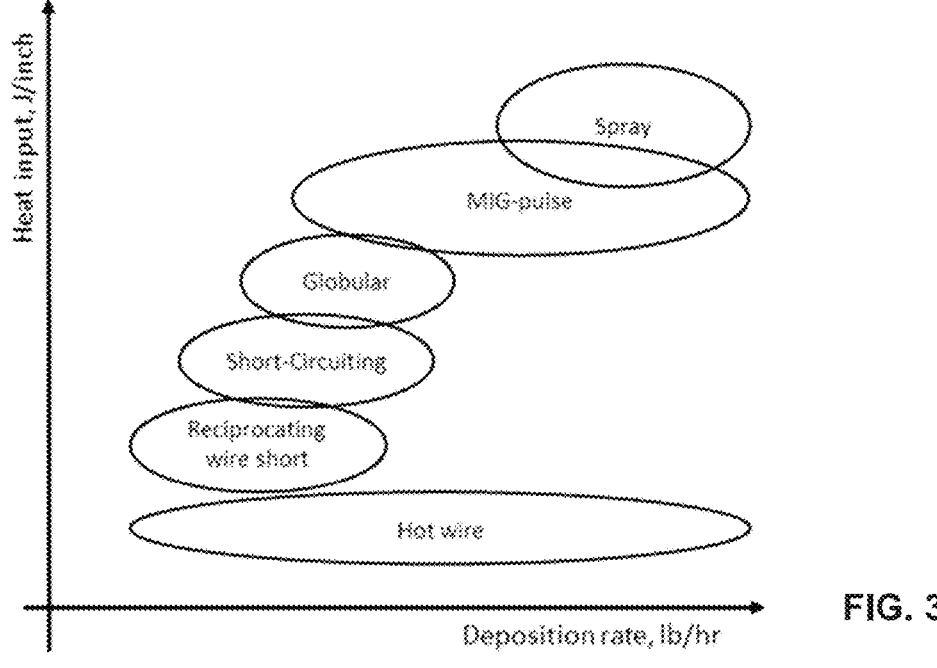
FIG. 3 is a graphical representation relating heat input and deposition rates for example welding-type programs, in accordance with aspects of this disclosure.

FIG. 3 illustrates is a graphical representation of the relationship between heat input and deposition rates for example welding-type programs. As shown, a "hot wire" welding-type program generates the lowest amount of heat. The heat generated increases from hot wire to reciprocating-wire short welding-type program, followed by a short-circuiting welding-type program, a globular welding-type program, a pulse welding-type program, and then to a spray welding-type program, which generates the greatest amount of heat.

As shown, there may be overlap between one or more welding-type programs with respect to the amount of heat generated during operation. Further, the range of deposition rate may be restricted in a given welding-type program. For instance, hot wire offers a range of deposition rates while generating a low amount of heat. However, reciprocating-wire short, short-circuiting, globular, and spray welding-type programs provide relatively narrow deposition rate ranges. MIG-pulse welding-type program may offer a range of deposition rates between the two.

As disclosed herein, the systems and methods may transition between welding-type programs in response to a temperature measurement (e.g., exceeding or falling below a threshold temperature), and may further adjust deposition rate within a selected welding-type program. Other welding parameters may also be adjusted (e.g., travel speed, etc.) to provide greater control of the additive manufacturing process. Such changes can be input via one or more interfaces, drawn from a selected weld sequence, based on a model of the part being formed, and/or calculated (e.g., via machine learning, one or more predetermined algorithms, etc.) based on one or more variables (e.g., sensor data, output power characteristics, etc.).

The provided illustration provides an example relationship, such that not all listed welding-type programs are available for each additive manufacturing system and/or operation, and additional or alternative welding-type programs may be included above, below, or in between one or more welding-type programs.

Figure 4:
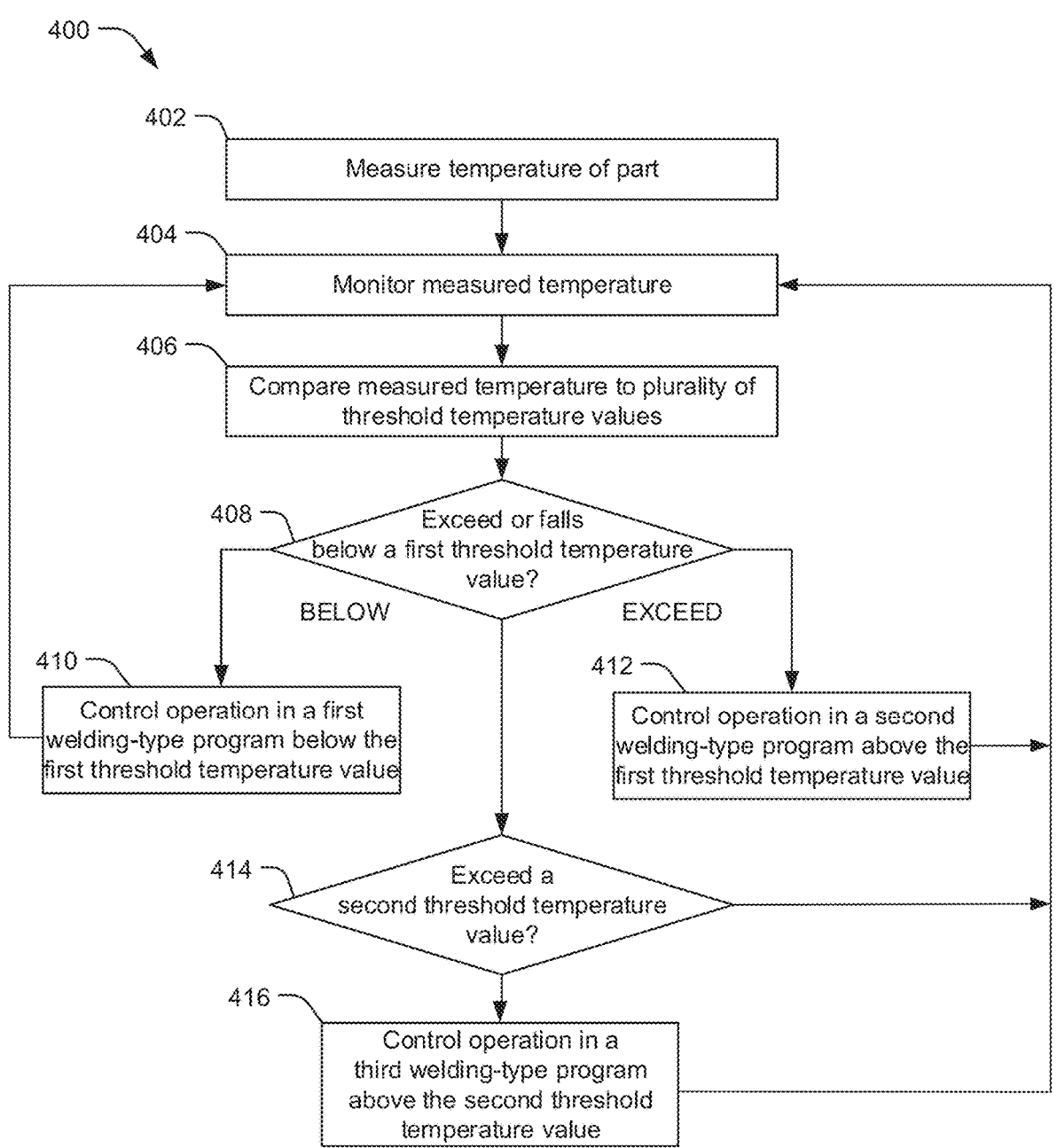
FIG. 4 illustrates an example method of controlling an additive manufacturing system, in accordance with aspects of this disclosure.

FIG. 4 provides a flowchart representative of example machine readable instructions 300 which may be executed by the example additive manufacturing system of FIG. 1 to implement an additive manufacturing process. The example instructions 400 may be wholly or partially stored in the memory circuitry 86 and wholly or partially executed by the processing circuitry 84 of the control circuitry 22, 32. The example instructions 400 are described below with reference to the systems of FIGS. 1 and 2.

In block 402, a sensor (e.g., sensor 70) measures a temperature of a part (e.g., multi-layer part 78) being built by an additive manufacturing tool (e.g., a metal inert gas (MIG) arc welding torch 16) configured to advance an electrode wire (e.g., wire 42) to a weld puddle on a surface of the part.

In block 404, control circuitry (e.g., control circuitry 22, 32) receives information from the sensor in order to monitor the measured temperature associated with the part.

In block 406, the control circuitry compares the measured temperature to one or more threshold temperatures. For example, the control circuitry may access a memory circuit or storage device (e.g., memory circuit 86) to access a model and/or list of a plurality of threshold temperature values associated with measured temperatures.

In block 408, based on the comparison, the control circuitry determines whether the measured temperature exceeds or falls below a first threshold temperature value of a plurality of threshold temperature values.

In block 410, the control circuitry controls the additive manufacturing tool to operate in a first welding-type program (e.g., a spray welding-type program such as a Constant Voltage (CV) spray welding-type program or a pulsed spray welding-type program) of a plurality of welding-type programs in response to a determination that the measured temperature is below a first threshold temperature of the one or more threshold temperatures.

In block 412, the control circuitry controls the additive manufacturing tool to operate in a second welding-type program (e.g., a Control Short Circuit (CSC) welding-type program) of the plurality of welding-type programs in response to a determination that the measured temperature is above the first threshold temperature.

In block 414, the control circuitry determines whether the measured temperature exceeds or falls below a second threshold temperature value of a plurality of threshold temperature values.

In block 416, the control circuitry is further configured to control the additive manufacturing tool to operate in a third welding-type program (e.g., a joule heating welding-type program) in response to a determination that the measured temperature is above a second threshold temperature of the one or more threshold temperatures.

Once a welding-type program is selected and implemented, the method returns to block 404 to continue monitoring the part temperature.

Figure 5:
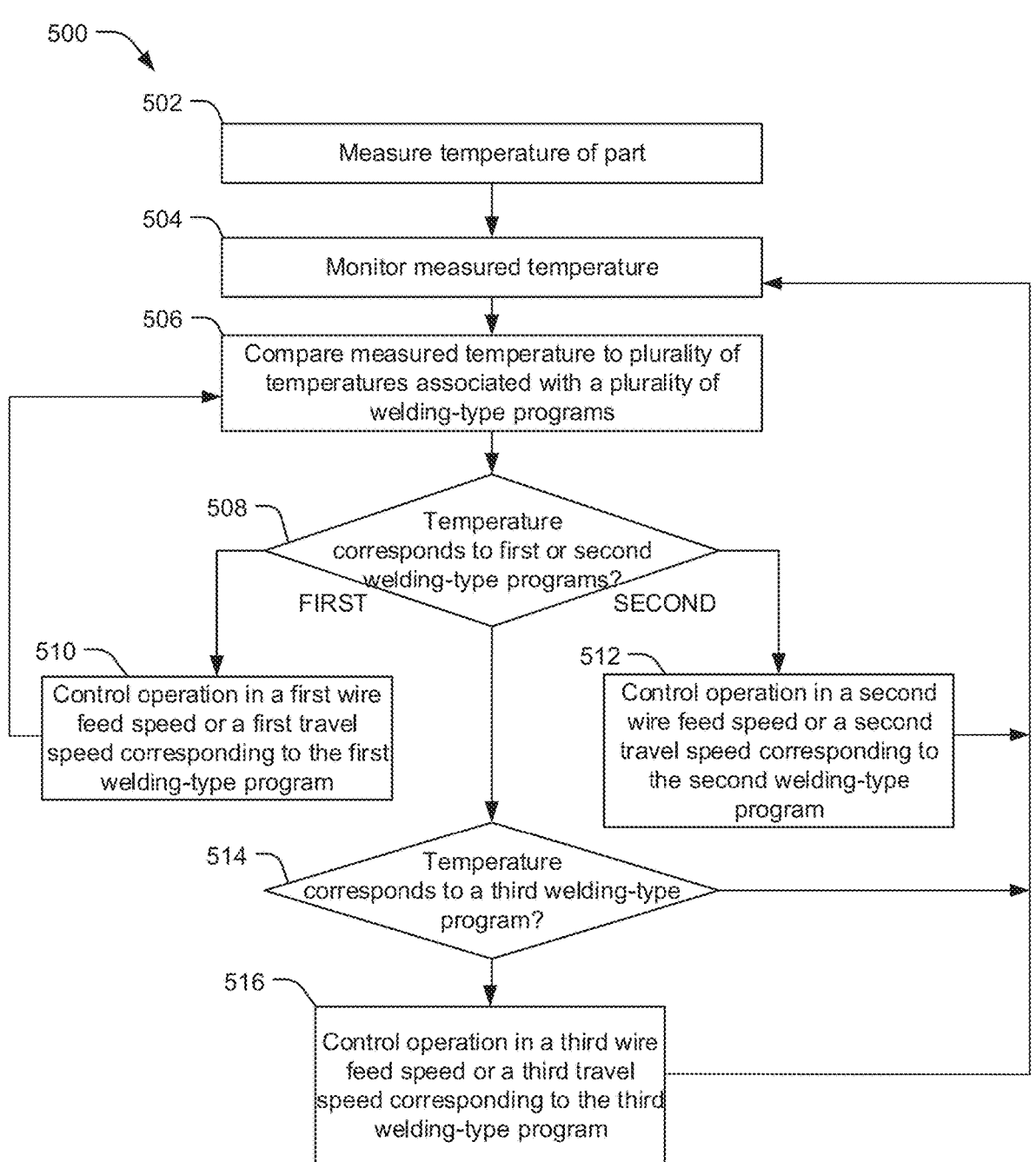
FIG. 5 illustrates another example method of controlling an additive manufacturing system, in accordance with aspects of this disclosure.

FIG. 5 illustrates another example method 500 of controlling an additive manufacturing system, as disclosed herein.

In block 502, a sensor (e.g., sensor 70) measures a temperature of a part (e.g., multi-layer part 78) being built by an additive manufacturing tool (e.g., a metal inert gas (MIG) arc welding torch 16) configured to advance an electrode wire (e.g., wire 42) to a weld puddle on a surface of the part.

In block 504, control circuitry (e.g., control circuitry 22, 32) monitors the measured temperature associated with the part.

In block 506, the control circuitry compares the measured temperature to a list of temperatures associated with a plurality of welding-type programs.

In block 508, the control circuitry determines whether the measured temperature corresponds to a first welding-type program or a second welding-type program of the plurality of welding-type programs based on the comparison.

In block 510, the control circuitry controls one or more of a wire feed speed or a travel speed of the additive manufacturing tool to operate at a first wire feed speed or a first travel speed corresponding to the first welding-type program based on the determination that the temperature corresponds to the first welding-type program.

In block 512, the control circuitry controls one or more of the wire feed speed or the travel speed of the additive manufacturing tool to operate at a second wire feed speed or a second travel speed corresponding to the second welding-type program based on the determination that the temperature corresponds to the second welding-type program.

Additionally or optionally, as shown in block 514, the control circuitry determines whether the measured temperature corresponds to a third welding-type program of the plurality of welding-type programs based on the comparison.

In block 516, the control circuitry controls one or more of the wire feed speed or the travel speed of the additive manufacturing tool to operate at a third wire feed speed or a third travel speed corresponding to the third welding-type program based on the determination that the temperature corresponds to the second welding-type program.

Once a welding-type program is selected and implemented, the method returns to block 504 to continue monitoring the part temperature.

Figure 6:
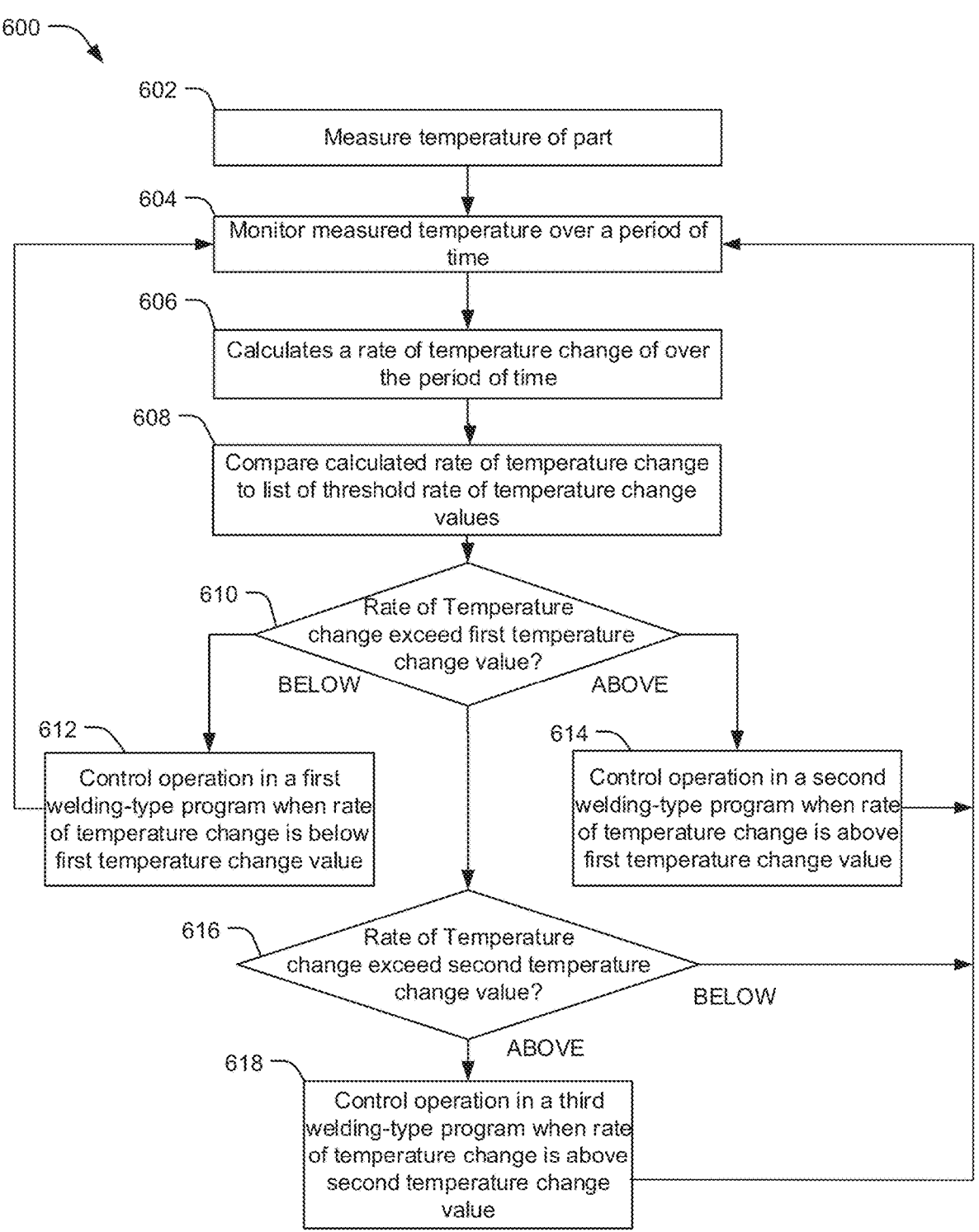
FIG. 6 illustrates yet another example method of controlling an additive manufacturing system, in accordance with aspects of this disclosure.

FIG. 6 illustrates another example method 600 of controlling an additive manufacturing system, as disclosed herein.

In block 602, a sensor (e.g., sensor 70) measures a temperature of apart (e.g., multi-layer part 78) being built by an additive manufacturing tool (e.g., a metal inert gas (MIG) arc welding torch 16) configured to advance an electrode wire (e.g., wire 42) to a weld puddle on a surface of the part.

In block 604, control circuitry (e.g., control circuitry 22, 32) monitors the measured temperature associated with the part over a period of time.

In block 606, the control circuitry calculates a rate of temperature change over the period of time. The rate of temperature change can be positive (representing an increase in temperature) or negative (representing a decrease in temperature). Thus, the trend can be analyzed to determine if the rate of change is approaching a threshold rate of temperature change values, such that the control circuitry may determine that a transition to another welding-type program is warranted.

In block 608, the control circuitry compares the rate of temperature change to a list of temperature change values.

In block 610, the control circuitry determines whether the rate of temperature change exceeds a first threshold temperature change values based on the comparison.

In block 612, the control circuitry controls the additive manufacturing tool to operate in the first welding-type program based at least in part on a determination that the rate of temperature change is below a first temperature change value.

In block 614, the control circuitry controls the additive manufacturing tool to operate in a second welding-type program based at least in part on a determination that the rate of temperature change is above the first temperature change value.

Additionally or optionally, in block 616, the control circuitry determines whether the rate of temperature change exceeds a second threshold temperature change values based on the comparison.

In block 618, the control circuitry controls the additive manufacturing tool to operate in a third welding-type program based at least in part on a determination that the rate of temperature change is above the second temperature change value.

Once a welding-type program is selected and implemented, the method returns to block 604 to continue monitoring the part temperature.

FIG. 7 illustrates yet another example method 700 of controlling an additive manufacturing system, as disclosed herein.

In block 702, a camera (e.g., camera 60) captures one or more weld bead characteristics.

In block 704, the control circuitry receives information from the camera to calculate weld bead size based on the one or more weld bead characteristics.

In block 706, the control circuitry compares the weld bead size to a list of threshold weld bead size values.

In block 708, the control circuitry determines whether the weld bead size exceeds a first threshold weld bead size value based on the comparison.

In block 710, the control circuitry controls the additive manufacturing tool to operate in the first welding-type program based at least in part on a determination that the weld bead size is below a first weld bead size value.

In block 712, the control circuitry controls the additive manufacturing tool to operate in a second welding-type program based at least in part on a determination that the weld bead size is above the first weld bead size value.

Additionally or optionally, in block 714, the control circuitry controls one or more of the wire feed speed or the travel speed of the additive manufacturing tool to operate at the first wire feed speed or the first travel speed based in part on the first weld bead size value.

In block 716, the control circuitry controls one or more of the wire feed speed or the travel speed of the additive manufacturing tool to operate at the second wire feed speed or the second travel speed based in part on the second weld bead size value.

Once a wire feed speed or a travel speed is selected and implemented, the method returns to block 704 to continue monitoring the part temperature.

Figure 8A:
FIGS. 8A and 8B illustrate example parts created by a conventional additive manufacturing system.
Figure 8B:

FIGS. 8A and 8B illustrate example parts created by a conventional additive manufacturing system. For example, materials such as metal are heated and cooled at a rapid rate when building a part using arc welding processes. As illustrated in FIG. 8A, at the start of an additive manufacturing process, the substrate upon which the part is being formed is relatively cold. Thus, heat from a welding process is absorbed and dissipates quickly, which causes a lack of fusion in the first few layers.

As illustrated in FIG. 8B, the molten pool collapsed due to excess heat near the top layers of the printed part, despite realizing suitable fusion to the substrate and the first few layers at the base. Moreover, the incremental height of each successive layer shows substantial variation. For example, at the first few passes, due to the large heat sink effect of the substrate, the deposited liquid metal did not wet out too much, creating a high but narrow bead. However, along with the buildup of successive layers, the temperature of the part increased and the molten pool started to droop, which created a lower but wider weld bead. Ultimately, the molten pool collapsed, damaging the part and halting the process.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. An additive manufacturing system, comprising:
an additive manufacturing tool configured to advance an electrode wire to a weld puddle on a surface of a part, wherein the part is a multi-layer part made of multiple layers of material from the electrode wire, and wherein the additive manufacturing tool comprises a metal inert gas (MIG) arc welding torch;
a sensor to measure a temperature of the part;
a camera to capture one or more weld bead characteristics of the weld puddle on the surface; and
control circuitry configured to:
monitor the measured temperature associated with the part;
compare the measured temperature to one or more threshold temperatures;
control the additive manufacturing tool to deposit the electrode wire on the surface operating in a first arc welding-type program of a plurality of welding-type programs in response to a determination that the measured temperature is below a first threshold temperature of the one or more threshold temperatures,
wherein the first arc welding-type program has a first power output level range corresponding to a first heat input range and a first deposition rate range, wherein the first heat input range corresponds to the first deposition rate range,
wherein the first heat input range and the first deposition rate range are configured to build up a subsequent layer of the multiple layers of material within a suitable fusion temperature range, and
wherein the first power output level range is configured to generate a first heat output configured to increase a temperature of the part;
control the additive manufacturing tool to deposit the electrode wire on the surface operating in a second arc welding-type program of the plurality of welding-type programs in response to a determination that the measured temperature is above the first threshold temperature,
wherein the second arc welding-type program has a second power output level range corresponding to a second heat input range and a second deposition rate range, wherein the second heat input range corresponds to the second deposition rate range,
wherein the second heat input range and the second deposition rate range are configured to build up the subsequent layer of the multiple layers within the suitable fusion temperature range,
wherein the second power output level range is configured to generate a second heat output configured to decrease the temperature of the part,
wherein the first arc welding-type program comprises at least one of a Constant Voltage (CV) spray welding-type program or a pulsed spray welding-type program, and
wherein the second arc welding-type program comprises at least one of a short circuit welding-type program or a joule heating welding-type program;
calculate weld bead size on the surface based on the one or more weld bead characteristics;
compare the weld bead size to a list of threshold weld bead size values;
control the additive manufacturing tool to operate in the first arc welding-type program to create a first layer of the multiple layers based at least in part on a determination that the weld bead size on the surface is below a first weld bead size value to at least partially fuse the multiple layers of material during the additive manufacturing process; and control the additive manufacturing tool to operate in the second arc welding-type program to create a second layer of the multiple layers based at least in part on a determination that the weld bead size on the surface is above the first weld bead size value to at least partially fuse the first layer to the second layer during the additive manufacturing process.

2. The system of claim 1, the control circuitry is further configured to control the additive manufacturing tool to operate in a third welding-type program in response to a determination that the measured temperature is above a second threshold temperature of the one or more threshold temperatures.

3. The system of claim 2, wherein the third welding-type program comprises a joule heating welding-type program.

4. The system of claim 1, wherein the multi-layer part being formed by the additive manufacturing system fuses an additional layer of material to the material to build up the multi-layer part.

5. The system of claim 4, wherein the control circuitry is further configured to:

receive one or more three-dimensional models of the multi-layer part; and adjust an operational characteristic of the system based on one or more of the three-dimensional models.

6. The system of claim 5, wherein the operational characteristic comprises a wire feeder direction of the wire feeder motor, a power output, a deposition path, a deposition sequence, or a tool angle, based on one or more of the three-dimensional models.

7. An additive manufacturing system, comprising:

an additive manufacturing tool configured to advance an electrode wire to a weld puddle on a surface of a part, the additive manufacturing tool comprising a metal inert gas (MIG) torch;

a sensor to measure a temperature of the part;

a camera to capture one or more weld bead characteristics of the weld puddle on the surface; and control circuitry configured to:

monitor the measured temperature associated with the part;

compare the temperature measurements over a period of time;

calculate a rate of temperature change of over the period;

compare the rate of temperature change to a list of threshold rate of temperature change values;

calculate weld bead size based on the one or more weld bead characteristics;

compare the weld bead size to a list of threshold weld bead size values;

in response to a determination that the rate of temperature change is below a first temperature change value, control the additive manufacturing tool to deposit the electrode wire operating in a first welding-type program to create a first layer of the part;

in response to a determination that the weld bead size is below a first weld bead size value, control the additive manufacturing tool to deposit the electrode wire operating in the first welding-type program to create the first layer of the part, wherein the first arc welding-type program has a first power output level range corresponding to a first heat input range and a first deposition rate range, wherein the first heat input range corresponds to the first deposition rate range, wherein the first power output level range is configured to generate a first heat output configured to increase a temperature of the part;

in response to a determination that the rate of temperature change is above the first temperature change value, control the additive manufacturing tool to deposit the electrode wire operating in a second welding-type program to create a second layer on the first layer; and in response to a determination that the weld bead size is above the first weld bead size value, control the additive manufacturing tool to deposit the electrode wire operating in the second welding-type program to create the second layer on the first layer, wherein the second arc welding-type program has a second power output level range corresponding to a second heat input range and a second deposition rate range different from the first heat input range and the first deposition rate range, wherein the second heat input range corresponds to the second deposition rate range, and wherein the second power output level range is configured to generate a second heat output configured to decrease the temperature of the part.

8. The system of claim 7, the control circuitry is further configured to control the additive manufacturing tool to operate in a third welding-type program in response to a determination that the measured temperature is above a threshold temperature.

9. The system of claim 8, wherein the third welding-type program comprises a joule heating welding-type program.

10. The system of claim 7, wherein the part being formed by the additive manufacturing system fuses an additional layer of material to the material to build up the part.

11. The system of claim 10, wherein the control circuitry is further configured to:

receive one or more three-dimensional models of the part; and adjust an operational characteristic of the system based on one or more of the three-dimensional models.

12. The system of claim 11, wherein the operational characteristic comprises a wire feeder direction of the wire feeder motor, a power output, a deposition path, a deposition sequence, or a tool angle, based on one or more of the three-dimensional models.

13. An additive manufacturing system, comprising:

a platform comprising a platform surface;

an additive manufacturing tool configured to deposit an electrode wire on a substrate to form a multi-layer part, wherein the substrate is defined by the platform surface of the platform or a welding surface of a top layer of one or more layers of the part, wherein each of the one or more layers of the part comprise material formed from the electrode wire, and wherein the additive manufacturing tool comprises a metal inert gas (MIG) torch;

a plurality of temperature sensors configured to measure a plurality of measured temperatures, the plurality of temperature sensors comprising:

a substrate temperature sensor configured to measure a measured substrate temperature of the substrate; and

a plurality of part temperature sensors placed about the
weld path and configured to measure a plurality of
measured part temperatures of a plurality of portions
of at least one of the one or more layers of the part;
and
control circuitry configured to:
  control the additive manufacturing tool to operate in a
  spray welding-type program to deposit the electrode
  wire upon the platform surface to create an initial
  layer of the part;
  control the additive manufacturing tool to continue
  operating in the spray welding-type program to
  deposit the electrode wire on the welding surface of
  the part to create one or more first layers of the part
  above the initial layer;
  after creating of each layer of the one or more first
  layers and before creating a subsequent first layer of
  the one or more first layers, monitor the plurality of
  measured temperatures;
  in response to a determination, based on at least any
  measured temperature of the plurality of measured
  temperatures, that at least some of the part or at least
  some of the platform surface has fallen below a first
  threshold temperature, control the additive manufac-
  turing tool to operate in a short circuit welding-type
  program or in a joule heating welding-type program
  to deposit the electrode wire on the welding surface
  of the part according to a first power output level
  range to create one or more second layers of the part
  above the one or more first layers,
    wherein the first power output level range corre-
    sponds to a first heat input range and a first
    deposition rate range,

22 wherein the first heat input range corresponds to the
    first deposition rate range,
    and
    wherein the first power output level range is config-
    ured to generate a first heat output configured to
    increase a temperature of the part;
  after creating each layer of the one or more second
  layers and before creating a subsequent second layer
  of the one or more second layers, monitor the plu-
  rality of measured temperatures;
  in response to a determination, based on at least any
  measured temperature of the plurality of measured
  temperatures, that at least some of the part or at least
  some of the platform surface has exceeded a second
  threshold temperature, control the additive manufac-
  turing tool to operate in the spray welding-type
  program according to a second power output level to
  deposit the electrode wire on the welding surface of
  the part to create one or more second subsequent
  layers of the part above the one or more first layers,
    wherein the second power output level range corre-
    sponds to a second heat input range and a second
    deposition rate range,
    wherein the second heat input range corresponds to
    the second deposition rate range,
    and
    wherein the second power output level range is
    configured to generate a second heat output con-
    figured to decrease the temperature of the part.
  14. The additive manufacturing system of claim 13,
wherein the first threshold temperature is equal to the second
threshold temperature.

* * * * *